INVENTORS
JOHN LA MOTTE SHAW
RONALD REX TAYLOR
BY
ATTORNEY

United States Patent Office 2,955,250
Patented Oct. 4, 1960

2,955,250
ELECTROMAGNETIC PROSPECTING
John La Motte Shaw and Ronald Rex Taylor, Copper Cliff, Ontario, Canada, assignors to The International Nickel Company, Inc., New York, N.Y., a corporation of Delaware Filed Mar. 21, 1958, Ser. No. 722,895
Claims priority, application Canada Oct. 24, 1957
25 Claims. (Cl. 324—4)

This invention relates to a method and an apparatus for detecting and measuring mineral ore bodies by operations which may be airborne or carried by a vehicle capable of movement on land or designed for movement on frozen terrain or on or in water and, more particularly, to an improved electromagnetic method and system therefor. The method of this invention comprises creating at least three electromagnetic fields, moving the fields relative to an area to be investigated and detecting variations of the fields as an indication of, and a measurement for, a conducting body. It further relates to special electromagnetic equipment useful for detecting and measuring mineral ore bodies by the aforesaid method and especially adapted for the practical and commercial application of the aforesaid method in the detection of ore bodies.

Attempts have been made to utilize two electromagnetic fields of closely similar frequencies and rely on coil orientation to cause a differential effect in the case of an ore body present in the field of the coils. However, certain types of ore bodies can be missed and with certain ground conditions the system is not too satisfactory. We have found that highly magnetic deposits cause a response or anomaly in the opposite direction to that caused by a body which is an electrical conductor. The explanation for these responses is based on the fact that a magnetic ore body concentrates the magnetic field within itself, resulting in a diminution of the field at the receiver, whereas a conductive ore body has induced in it eddy currents which give rise to a secondary field that adds to the primary field and increases the resulting field at the receiver. This has been verified by actual airborne tests. In some ore bodies this magnetic effect is balanced by the conductive effect and, even though the ore body is economically useful, no response is obtained at the receivers of the prior art systems. However, our improved method and novel apparatus will detect such ore bodies regardless of any such magnetic-conductive balance in the ore body.

In accordance with another known system, two electromagnetic fields of considerably different frequencies are created by two parallel transmitting coils and received by two similarly disposed receiving coils. This system can be dependent on using one of the two fields as a reference field at such a low frequency that no response to a conductor is obtained from that field and the total response recorded is from the higher frequency field. Alternately, the indication of a conductor can be based on the differential response between the two frequencies. In the first case, equipment becomes so heavy and bulky due to the extremely low frequency required that the system becomes totally impractical. If frequencies are chosen to utilize a differential response, the good conductors are partially or totally cancelled while poor conductors (conductive water or uneconomical mineral deposits) show the highest anomaly. Thus, this system emphasizes the least desirable type of good conductors and would fail to indicate the presence of a good conductive ore body.

In the aforementioned prior systems as well as other prior systems, it has been found that ore bodies can be missed because maximum information is not produced and adequate coverage of conductivities cannot be obtained. Although attempts were made to overcome the foregoing difficulties and other disadvantages, none, as far as we are aware, was entirely successful when carried into practice commercially on an industrial scale.

We have discovered an improved method and apparatus for airborne prospecting by which the limitations of previous methods and apparatus are eliminated and full and complete prospective coverage of an area can be obtained. Ore bodies that would be missed by previous methods may now be detected. Further, more complete information can be obtained on conductive bodies by the use of our novel method and apparatus than was recorded by prior methods.

Accordingly, it is an object of this invention to provide an improved electromagnetic prospecting apparatus.

It is a futrher object of this invention to provide a method and apparatus for detecting conductive bodies and also distinguishing between better conductors of economical interest and poorer conductors.

It is another object of this invention to provide an apparatus for detecting and measuring both conductive bodies and magnetic bodies.

This invention also contemplates providing electromagnetic apparatus for detecting and measuring mixtures of conductive ore and magnetic ore.

It is a still further object of this invention to provide apparatus for airborne electromagnetic prospecting which will detect conductive bodies which cannot be satisfactorily detected by known methods.

The invention further contemplates providing an improved electromagnetic method of ore prospecting.

It is another object of the invention to provide an improved method for detecting and measuring both conductive bodies and magnetic bodies and mixtures thereof.

Still another object of the invention is to provide an improved method for airborne electromagnetic prospecting which will detect ore bodies which could not be satisfactorily detected by known methods.

Other objects and advantages of the present invention will become apparent from the following description taken in conjunction with the accompanying drawing in which.

Generally speaking, the present invention contemplates a novel method and apparatus for electromagnetic prospecting for deposits such as conductive ore bodies and magnetic ore bodies in which three electromagnetic fields are employed, of which two are primary fields of different frequencies F–1 and F–2 and the third is a reference field at a third frequency F–3. The two frequency-distinguished primary fields are radiated by a transmitting coil arrangement in a manner such that these two fields have similar field patterns for at least a limited region in space. The two primary electromagnetic fields at the different frequencies F–1 and F–2 are radiated by a transmitting coil system and these primary fields, including the variations in them due to the presence of various conductive bodies, are received by a receiving coil system. It should be understood that a single coil tuned to two frequencies may be considered the equivalent of two closely spaced parallel coils throughout this disclosure and claims and this is true of receiving coils as well as transmitting coils.

Figure 3A:
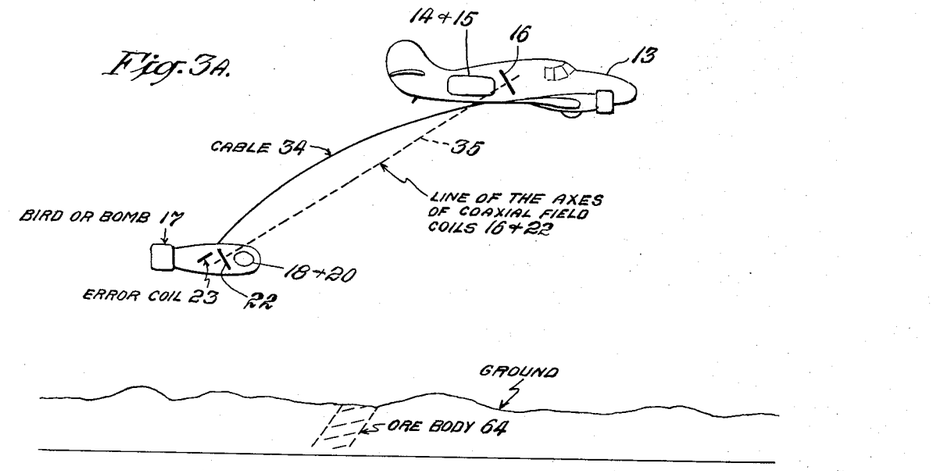
Figs 3A and 3B are, respectively, a side eelvational view and a plan view depicting an aircraft with a trailed bird in flight and showing a preferred arrangement of the coils oriented with respect to the earth and to an ore body.
Figure 3B:
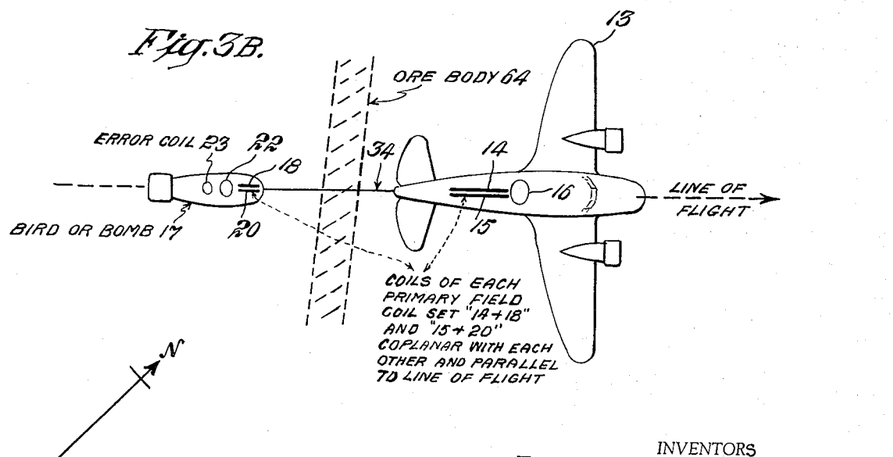

Accordingly, the two primary electromagnetic fields at the frequencies F-1 and F-2 may be radiated by a single coil or by two parallel coils. The two primary fields also may be radiated by two substantially coplanar coils. This coplanar coil arrangement may be considered as a special case of two parallel coils. The responses due to the two primary fields may be received by a single coil or by two separated coils. The primary receiving coil or coils may be each positioned substantially coplanar with its corresponding primary transmitting coil. It has been found that this substantially coplanar orientation of transmitting and receiving coils is the orientation for a maximum response from most ore bodies and is therefore the normally employed coil orientation for the primary fields. The primary field coils preferably are positioned substantially vertically as the most suitable orientation both from the standpoint of installation and of responses from most conductive bodies. The third electromagnetic field operates at a frequency which may be reasonably near that of one or the other primary field or may be between the frequencies F-1 and F-2 of the two primary fields. This third field is used as a reference field and is provided by applying current at the desired frequency F-3 to another transmitting coil. The responses due to the third or reference field are received by another receiving coil. The transmitting and receiving coils for the third or reference electromagnetic field may be arranged substantially coaxial or coplanar with each other and preferably are substantially orthogonal to the primary field coils. It has been found that the coaxial orientation is preferred and that this transmitter-receiver coil orientation gives minimum responses from most ore bodies. While there are several possible coaxial and coplanar combinations, the preferred arrangement for ore bodies of the type normally encountered is shown in Figs. 3A and 3B. The signals from each of the three receiving coils operating at the frequencies F-1, F-2 and F-3 are amplified, modulated and detected. However, the detected signals from the pair of primary receiving coils operating at the frequencies F-1 and F-2 are not combined or balanced against each other since this would induce the difficulties inherent in known systems such as those described earlier. To the contrary, in our new method the detected signals from the fields operating at the frequencies F-1 and F-2 are separately compared with the detected signal from the third or reference field at frequency F-3. The two resulting differential outputs may be recorded. The differential output from the responses due to the primary field at the relatively lower frequency F-1 and the reference field at frequency F-3 is hereinafter called the first differential output. The differential output from the responses due to the primary field at the relatively higher frequency F-2 and the reference field at frequency F-3 is hereinafter called the second differential output. A comparison of these detected differences or differential outputs will indicate conductors and permit differentiation between better conductors and poorer conductors.

The invention further contemplates that both of the aforesaid differential outputs will respond in a negative manner to magnetic ore bodies and in a strongly positive manner to ore bodies that are good conductors. The first differential output, i.e., the one due to the relatively lower frequency primary field, will respond only weakly to ore bodies that are moderate conductors whereas the second differential output, i.e., the one due to the relatively higher frequency primary field, will respond strongly positive to ore bodies that are moderate conductors. In certain cases, as pointed out hereinbefore, a body may have magnetic and conductive properties such that at a definite frequency their effects cancel and no evidence of the body's existence ordinarily would be recorded in the aircraft by conventional procedures. However, the use of two or more primary frequencies together with a reference frequency in accordance with this invention would eliminate this possibility of missing a conductive body. When proceeding in accordance with this invention, the first differential output will respond to an ore body having a magnetic conductive balance at the relatively higher frequency F-2 but will not respond at all to an ore body having a magnetic-conductive balance at the relatively lower frequency F-1. Furthermore, the second differential output of this invention will not respond at all to ore bodies containing a magnetic conductive balance at the relatively higher frequency F-2; but this differential output will respond to an ore body having a magnetic-conductive balance at the relatively lower frequency F-1. Thus, the improved method and apparatus of this invention will detect such ore bodies regardless of any magnetic-conductive balance in the ore body.

The first differential output will respond to conductive ground water only weakly or not at all, whereas the second differential output will respond to conductive ground water less strongly than to a good conductor. Although the second differential output will respond strongly positive to a good conductor if this conductor is situated in a large mass of conductive water, the entire response might be interpreted as being due to the conductive water. However, the first differential output also responds in a positive manner to a good conductor but not to a large mass of conductive water. It is therefore possible to distinguish the good conductor.

It will therefore be appreciated that by employing more than one primary electromagnetic field at different frequencies together with a reference magnetic field at another frequency in accordance with this invention, a comparison of the responses obtained can give desirable information on the conductivity of the body responsible for the responses. For example, when a body gives rise to a large differential response or output in accordance with the new method when using a primary field at 5000 cycles but gives a little or no differential response when using a primary field at 1000 cycles, these responses would be considered caused by a relatively poorly-conductive material. By similar reasoning, when a body gives rise to a good differential response both when using a primary field at 250 cycles and when using a primary field at 1000 cycles, these responses would be considered caused by material with relatively good conductivity. The range of conductivities to be investigated may be regulated by governing the primary frequencies employed for comparison purposes. In certain areas, particularly where the drainage is poor, the conductivity of the water may be such that it will give a large differential response when using a primary field at, for example, 1000 cycles. However, at 250 cycles this same water will give a little or no differential response. By comparing these differential responses the causative body can be interpreted as conductive water. The situation could arise where a sulfide body response would be masked by the overall effect of conductive water where the frequency employed falls within the conductivity range of the water. However, the use of a second lower primary frequency enables differentiation between the effect of the more conductive sulfide body and the effect of the water.

An important advantage of using two primary frequencies together with a third or reference frequency in accordance with this invention is that in addition to giving the wider range of conductivities falling within the response region, which may be desirable in certain instances, it also makes it possible to determine whether a low amplitude differential response or output is the result of a relatively poorly-conductive material near the surface or a material of relatively good conductivity beneath a considerable depth of overburden. That is, as the primary frequency is lowered a differential response from a relatively-poor conductor will drop off and, similarly, as the depth of overburden over a good conductor is increased, its differential response will drop off. Should a low amplitude differential response have the same magnitude when using the low primary frequency as when using the higher primary frequency, it can be deduced that this similarity of differential responses is caused by a material with relatively good conductivity under a considerable depth of overburden. For our purposes, any overburden depth greater than about 150 feet may be classified as considerable.

Accordingly, it is apparent that, by utilizing information obtained from the two differential outputs, no ore bodies will be missed due to their having a magnetic-conductive balance; a good ore body in a body of conductive water will not be missed; and, by a comparison of the magnitudes of the two differential outputs for the same ore body, an estimate can be made of the conductivity of the ore body.

The present invention contemplates preferably employing a frequency between about 500 cycles per second and about 5000 cycles per second for the primary field operating at the relatively higher frequency F–2 and employing a frequency of between about 100 cycles per second and about 1000 cycles per second for the primary field operating at the relatively lower frequency F–1. As pointed out hereinbefore, the third or reference electromagnetic field is operated at a frequency which may be reasonably near one or the other of the primary frequencies F–1 and F–2 or which may be between the two primary frequencies F–1 and F–2.

It is apparent that the selection of these frequencies need not necessarily be within the foregoing ranges and still come within the scope of this invention. The selection of the reference frequency should be made such that it is sufficiently different from both of the primary frequencies that the reference frequency does not present a filtering problem with relationship to either of the two primary frequencies. In choosing the reference frequency F–3, care should be taken to avoid a multiple frequency of either primary frequency F–1 or F–2 or any of their lower harmonics. From the viewpoint of size of equipment and power requirements, it is preferable to have the reference frequency F–3 closer to the relatively high primary frequency F–2 than to the relatively low primary frequency F–1. In certain cases the reference frequency F–3 may be somewhat lower than the relatively low primary frequency F–1. However, the reference frequency F–3 generally is higher than the relatively low primary frequency F–1 and may even range above the relatively higher primary frequency F–2. It should be pointed out at this time that in connection with this reference frequency it is the orientation arrangement that is important to our operations and not necessarily the absolute frequency itself of the reference field.

Figure 1:
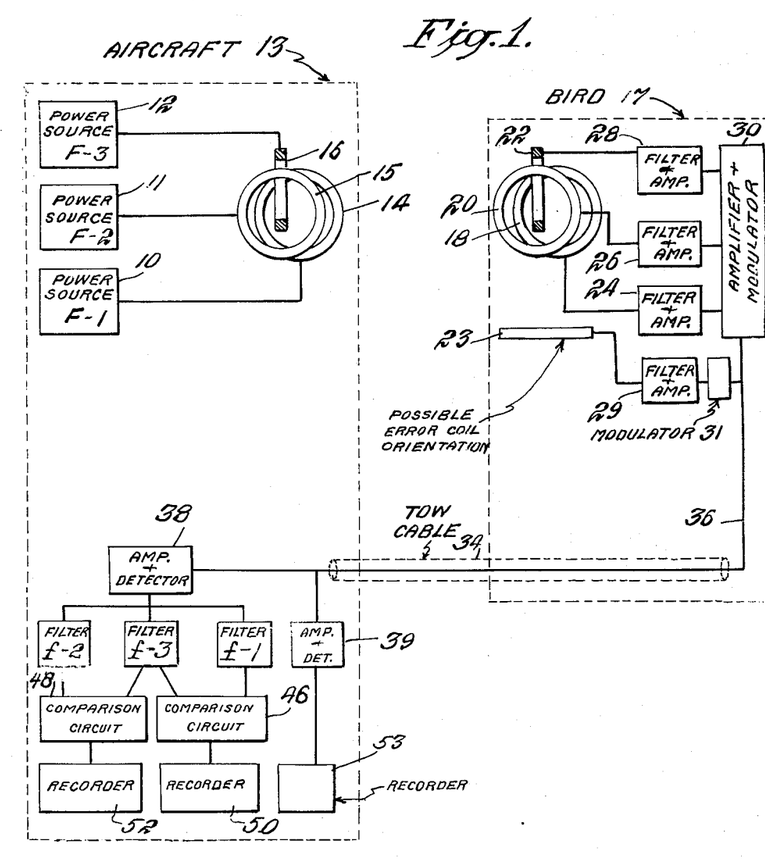
Fig. 1 is a schematic and block representation of an illustrative embodiment of this invention.

An illustrative embodiment of the novel apparatus in accordance with this invention is shown in combined block and schematic form in Fig. 1 of the drawing. As therein depicted, the system includes three alternating current power sources 10, 11 and 12 connected to transmitting coils 14, 15 and 16, respectively. In this embodiment, the primary field transmitting coils 14 and 15 are shown positioned in parallel planes, while reference field transmitting coil 16 is shown oriented orthogonally to the coils 14 and 15. Power sources 10 and 11 supply current at the two primary frequencies F–1 and F–2 to their respective transmitting coils 14 and 15 while power source 12 supplies current at the third, or reference, frequency F–3 to the transmitting coil 16. Coils 14, 15 and 16 may be carried by any suitable craft such as a metal aircraft, a wooden aircraft, a helicopter, or a vehicle capable of movement on land, on frozen terrain, or in or on water. The craft is indicated generally by block 13. The transmitting coils 14, 15 and 16 may be in an aircraft, for example, in an enclosed non-conductive extension of a metallic aircraft, or on the aircraft, or they may be carried in a bird or bomb suspended from the aircraft. In this embodiment of the invention, the responses from the two primary fields generated by the coils 14 and 15 are received independently by a pair of receiver coils 18 and 20 that are substantially coplanar with their respective transmitting coils 14 and 15. A third receiver coil 22 is provided to receive the responses due to the electromagnetic field generated by the third transmitting coil 16. Coaxial orientation is preferred between the third transmitting and receiving coils 16 and 22. The three receiving coils 18, 20 and 22 may be located in a bird or bomb 17, which may be suspended from the aircraft by means of a tow cable 34, as indicated in the drawing, or they may be carried in or on the transmitting coil carrying craft or by a separate craft. However, it is understood that other locations of the transmitting and receiving coils may be employed.

Figure 2:
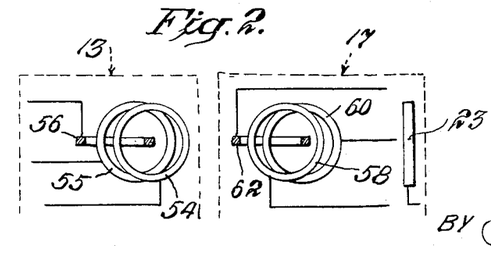
Fig. 2 shows a portion of the schematic and block representation of Fig. 1 illustrating an alternative arrangement of the transmitting and receiving coils.

Another advantageous arrangement of the transmitting coils and the receiving coils is shown in Fig. 2 of the drawing. As therein depicted, two primary-field transmitting coils 54 and 55 and two primary-field receiving coils 58 and 60 are oriented similar to the primary-field transmitting and receiving coils in Fig. 1. There is provided a third transmitting coil 56 and a third receiving coil 62 for the third or reference electromagnetic field at the frequency F–3. This pair of reference-field transmitting-receiving coils is shown oriented coplanar with each other and is also shown oriented orthogonally to the primary transmitting and receiving coils. The transmitting and receiving coils of this arrangement may be connected to electrical circuits and mineral detecting and measuring apparatus in the same manner as depicted in Figure 1 and described hereinafter. The orientation of the coils in Fig. 2 may advantageously represent a desirable coaxial arrangement of the coils when the bird or bomb is suspended almost directly below the aircraft as well as representing a coplanar arrangement which may advantageously be used when the bird or bomb is directly behind the aircraft.

It is important to have freedom in choice of coil orientation. Coil orientation may be chosen to discriminate against flat-lying bodies where vertical bodies are sought. For most substantially-vertical bodies, the coil orientation depicted in Figs. 3A and 3B is considered preferable. Various coil orientations will give different responses depending on the dip and strike of the body relative to the flight path. Accordingly, combinations of coil orientations can be used to provide data for interpretations of the characteristics of the conductive body. For example, both a set of coaxial reference coils, such as those of Figs. 3A and 3B, and a set of coplanar reference coils, such as indicated in Fig. 2, may be provided and the reference field power source 12 may then be connected to use either reference field coil set.

Referring now to Figs. 3A and 3B, there is shown a further embodiment of the apparatus for detecting and measuring mineral ore bodies. There is depicted an aircraft 13 in flight with a bird or bomb 17 which may be suspended from the aircraft by means of a tow cable 34 and shows a preferred arrangement of the coils oriented with respect to each other, to the earth and to an ore body. The transmitting and receiving coils of this arrangement may be connected to electrical circuits and mineral detecting and measuring apparatus in the same manner as depicted in Fig. 1 and described hereinafter. In the Figs. 3A–3B embodiment, the transmitting coils 14 and 15 for the two primary electromagnetic fields are shown positioned in planes parallel to each other and to the direction or line of flight. These primary-field transmitting coils preferably are positioned vertically. There is provided a pair of primary-field receiving coils 18 and 20 similarly positioned in the bird or bomb 17. Thus, the coils in each set of primary-field transmitting-receiving coils 14 and 18 and 15 and 20 may be arranged coplanar with each other and also may be parallel to the direction of flight. As disclosed hereinbefore, a coplanar orientation of the primary-field transmitting and receiving coils is preferably employed since it is the orientation having maximum response from most ore bodies. The third or reference field is radiated by a transmitting coil 16 which is preferably positioned in the aircraft 13 orthogonally to the primary-field transmitting coils 14 and 15. The responses due to the reference field are received by a third receiving coil 22 in the bomb, preferably positioned orthogonally to the primary field receiving coils 18 and 20. Coaxial orientation is preferred between the reference field transmitting and receiving coils 16 and 22. Accordingly, the reference field transmitting and receiving coils 16 and 22 are depicted in Fig. 3A as positioned normal to a common line of axes 35. When one set of coils is carried in a bomb towed from an airplane as depicted, for example, in Figs. 3A and 3B, in normal operations the most efficient cable length for the tow cable 34 is approximately 500 feet. This cable length is governed to some extent by the weight and drag of the bomb and cable; and the cable length may be changed by paying out more or less cable depending on the air speed of the craft. At low air speeds it may be desirable to reduce the length of the cable; and at higher air speeds it could be desirable to increase the length of the cable.

As illustrated in Fig. 1 of the drawing, suitable filter and amplifier circuits 24, 26 and 28 may be connected to receiving coils 18, 20 and 22, respectively. The three receiving coils may be tuned to the frequencies F-1, F-2 and F-3, respectively, to reduce pick up from other frequencies. Further reduction of signals from other frequencies is obtained by the filter portions of circuits 24, 26 and 28 which are tuned to the frequencies F-1, F-2 and F-3 of the power sources 10, 11 and 12, respectively. The output of these filter and amplifier circuits may be combined and amplified in a common amplifier and modulator 30. The filter and amplifier circuits 24, 26 and 28 and the amplifier and modulator 30 may be positioned in the same craft with the receiving coils 18, 20 and 22. When a bird 17 is used to carry the receiving coils and their filter and amplifier circuits, the output of the modulator 30 may be connected, through a suitable conductor 36 contained in the tow cable 34, to the amplifier and detector 38. Impression of the received signals on an electrical carrier wave as in the modulator 30 in the bird, when the signals are to be transmitted to the aircraft through an electrical conductor such as the conductor 36 in the tow cable 34, reduces interference from spurious signals picked up in, or caused by, the long tow cable. In the amplifier and detector 38 the signals due to each of the electromagnetic fields, including the responses due to the presence of various bodies in the earth, are separated from the electrical carrier wave. The output of amplifier and detector 38 is connected to the inputs of three filters $f-1$, $f-2$ and $f-3$. Filters $f-1$, $f-2$ and $f-3$ are each tuned to a separate one of the same frequencies F-1, F-2 and F-3 as the power sources 10, 11 and 12, respectively. This additional group of filters separates the combined signals into the three frequencies F-1, F-2 and F-3 and further provides for the removal of undesirable signals at other frequencies. The output leads of the filter $f-1$ at the relatively low primary frequency F-1 and the filter $f-3$ at the reference frequency F-3 are connected to a first comparison circuit 46 and the output leads of the filter $f-2$ at the relatively high primary frequency F-2 and the filter $f-3$ at the reference frequency F-3 are connected to a second comparison circuit 48. The two differential outputs will respond to various bodies as described hereinbefore. The output of the first comparison circuit 46 may be connected to a suitable recorder 50 while the output of the second comparison circuit 48 may be connected to another suitable recorder 52. However, any suitable means may be provided for comparing the differential outputs of the two comparison circuits 46 and 48.

The circuits employed in the Cartier et al. U.S. Patent No. 2,623,924, issued December 30, 1952, to compare the responses of two fields may be employed in obtaining each of the two differential outputs in the new system of the present invention. As described in the Cartier et al. U.S. patent, the received signals may be filtered and are combined and amplified by a common amplifier, then separated by filters into responses at each of the two frequencies to be compared. The relative amplitudes at the two frequencies are then compared by differential rectifiers and their combined output then would constitute a single differential output which may be fed to a suitable indicating unit.

If parts of the apparatus are carried by a bird or birds suspended from the aircraft, as mentioned hereinbefore and as depicted, for example, in Figs. 3A and 3B, it may be desirable to provide an error system to indicate misalignment between the receiving coils and the transmitting coils. Such a system may employ one or more error detection coils in conjunction with the receiving coils. In each of the embodiments depicted in the drawing, there is shown an error coil system in which an error detection coil 23 is arranged substantially orthogonally to the three receiving coils for the responses due to the reference and primary fields. In this arrangement when the bird 17 is in correct position with respect to the aircraft 13 so that the primary-field and reference-field receiving coils are properly aligned to their respective transmitting coils, the error detection coil 23 is orthogonal to all three transmitting coils and, hence, is at null to all three transmitted fields ad no signal is present in the error coil. If any misalignment occurs between the transmitting coils and the receiving coils, the error detection coil 23 will no longer be at null but will receive a signal. The signal received by the error detection coil 23, after suitable amplification and detection, may be recorded in the aircraft or, if desired, may be used to orient the transmitting coils and/or the receiving coils. The error detection coil 23, in each of the embodiments of the apparatus shown in the drawing, may be connected as shown in Fig. 1 to a separate filter and amplifier circuit 29, the output from which may be applied to a modulator 31 wherein the error signals are applied to a different carrier wave than that used in the modulator 30. The output from the modulator 31 may then be fed through conductor 36 in the tow cable 34 to an amplifier and detector 39. This amplified and detected error signal may then be supplied to apparatus shown generally by block 53 which may represent means for separating and recording the error signals at the different frequencies and/or means to orient the transmitting coils and/or the receiving coils to minimum error indication. Of course it will be appreciated that the primary coils may, if desired, be mechanically fixed in position in both the aircraft and the bird, in which case any correctional change in coil orientation would be applied to the reference field transmitting and/or receiving coil. It also will be appreciated that, in view of the radiation of the two primary electromagnetic fields by a single coil or by two coplanar or parallel coils, any errors due to misalignment of the primary-field coils will be proportional between the primary fields at the frequencies F-1 and F-2. Accordingly, it is usually only necessary to tune the error coil and its circuits to detect error signals at the frequencies of the reference field and one of the primary fields, such as the primary field having the greatest frequency distinction from the reference-field frequency. If there is any misalignment between the coplanar primary-field coils, the error signals therefrom will be at a primary-field frequency. If there is any misalignment between the reference field coils, which will be oriented differently to and preferably orthogonally to the primary field coils, there will be an error signal at the frequency of the reference field. Thus, when the detected error signals are sent to the aircraft and the frequencies separated as, for example, in the recorder 53, the amount of misalignment of both the reference field coils and the primary field coils, and the coils which are misaligned, can be indicated.

Instead of using the foregoing error system depicted in the drawing, or in addition thereto, if desired, an electro-optical system may be employed of the type disclosed in detail in our copending patent application Serial No. 722,954, filed March 21, 1958, for maintaining a relatively constant relationship between the parts of the apparatus carried in the aircraft and the parts of the apparatus carried in the bird. As disclosed in that application, the electro-optical error indicating and positional control system comprises a light source which may be positioned in the aircraft (or bird) and which projects a beam of light toward a light-responsive system in the bird (or aircraft). Preferably, means are provided for rendering the error system insensitive to extraneous sources of light such as sunlight and reflections. For this purpose the beam of light may be modulated and the light-responsive system may have associated therewith filters which permit the passage of only modulated signals corresponding to the modulated light beam. The light-responsive system has an optical pyramid around which are grouped four photocells so arranged with each photocell facing a different side of the optical pyramid that the light beam from the light source strikes the apex of the optical pyramid and the light may be directed equally at all four of the photocells when the receiving coils are properly aligned with their respective transmitting coils. Any deviation from this proper alignment causes a change in the light falling on at least one of these cells. The variation in the responses of the photocells due to such change in the light distribution may be used to actuate a control mechanism to orient the transmitting coils and/or the receiving coils. Advantageously, this variation in the responses of the photocells may be employed through suitable electrical and mechanical means to operate control fins on the bird whereby a desired positional relationship may be maintained between the bird and the towing aircraft.

For the purpose of giving those skilled in the art a better understanding of the invention, the novel operations may be further illustrated by considering the general arrangement of Figs. 3A and 3B wherein the transmitting coils are positioned in an aircraft and the receiving coils are positioned in a bird or bomb towed by the aircraft and the coils are connected to electrical circuits and mineral detecting and measuring apparatus as depicted in Fig. 1. A power source 10 may supply current at a primary frequency F-1 of about 500 cycles per second to a transmitting coil 14; a power source 11 may supply current at a second primary frequency F-2 of about 2500 cycles per second to a transmitting coil 15; and a power source 12 may supply current at a third or reference frequency F-3 of about 2000 cycles per second to a third transmitting coil 16. Electromagnetic fields are radiated by coils 14, 15 and 16 and these fields, including the responses due to the effect of various bodies in the earth on these fields, are picked up by the receiving coils 18, 20 and 22, filtered and amplified by their associated filters and amplifiers and may be applied to a common amplifier and modulator 30. The output of amplifier and modulator 30 may then be fed through conductor 36 in the tow cable 34 to an amplifier and detector 38 in the aircraft. The received signals may again be filtered by filters f-1, f-2 and f-3 which are each tuned to a separate one of the transmitted frequencies; for example, filter f-3 may be tuned to the reference frequency F-3, filter f-1 may be tuned to the relatively lower frequency F-1 and filter f-2 may be tuned to the relatively higher primary frequency F-2. The outputs of filters f-1 and f-3 are applied to a first comparison circuit 46 and the resultant differential output or response may be recorded by a recorder 50. The output of filter f-2 and the output of filter f-3 are similarly applied to a second comparison circuit 48. The differential output or response of comparison circuit 48 may be recorded by a recorder 52. The two differential outputs will respond to the various bodies as described hereinbefore. As depicted in Figs. 3A and 3B, the transmitting coils for radiating the three electromagnetic fields may be set up in the aircraft with the reference-field transmitting coil 16 preferably orthogonally arranged with respect to the two parallel primary-field transmitting coils 14 and 15. Of course, as explained hereinbefore, the two primary fields may be radiated by either a pair of parallel coils, as shown in the drawing, or by two coplanar coils or by a single coil. Advantageously, all of the transmitting coils, such as 14, 15 and 16, may be adjustably positioned by any well-known means for both movements of translation and movements of rotation. If desired, the primary-field transmitting coil or coils may be in fixed position in the aircraft and only the differently-oriented reference-field transmitting coil adjustably positioned for regulating the coil orientations before or during flight, e.g., in response to error or misalignment indications received during flight by an error system such as hereinbefore described. The primary-field transmitting coil or coils are preferably positioned substantially vertically and also may be parallel to the longitudinal axis or direction of flight of the aircraft as shown in Fig. 3B. The receiving coils are similarly arranged in the bird or bomb 17. The primary-field receiving coil or coils, such as 18 and 20, also may be arranged substantially vertically and parallel to the longitudinal axis or normal direction of flight of the bird or bomb. Each primary-field receiving coil will thus be coplanar with its corresponding primary-field transmitting coil when the bird or bomb is trailed behind the aircraft in flight. The reference-field receiving coil 22 is arranged in the bomb so that it is preferably orthogonal to the primary field receiving coil or coils and, at the same time, so positioned that it will be coaxial with the reference-field receiving coil when the bird or bomb is trailed behind the aircraft in flight. If desired, a preliminary flight may be made during which the angle a line from the aircraft to the bird or bomb makes with the horizontal may be determined, for example, by use of a drift sight instrument comprising an optical telescope and a calibrated mirror. The reference-field transmitting and receiving coils may then be set to this angle, for example, with a clinometer. Some relative movement of the bird or bomb out of the desired alignment with the aircraft during flight is compensated for by the novel arrangement of this invention wherein at least two primary electromagnetic fields of different frequencies are radiated together with a reference field of another frequency and the detected signals due to each primary field are separately compared with the detected signals due to the reference field to produce differential outputs which together provide an indication of conductive and/or magnetic bodies. Accordingly, the present invention may be practiced without using an error indication and/or positional control system. However, if desired, an error and/or positional control system may be provided, such as the previously-described error system, using an error coil 23 as depicted in the drawing or an electro-optical system as hereinbefore described. It is apparent that, by utilizing information of the two records obtained of the two differential outputs, this apparatus will not miss any ore bodies, for example, due to a magnetic-conductive balance in the ore. Further, a good ore body in a conductive water region will not be missed. Still further, a comparison of the differential responses may be utilized to indicate the relative conductivity of the ore body.

The new three frequency system employing the special orientation of the transmitting and receiving coils and the frequency comparison principles of this invention may also be used with a single bird suspended below a slowly-moving aircraft in which both the transmitting and receiving coils are located in fixed positions relative to each other in the bird and in which the bird may be carried at any desired orientation with respect to the earth's surface or to an ore body as disclosed and described in detail in application Serial No. 723,004, filed March 21, 1958, by R. R. Taylor and J. L. Shaw.

It is to be observed that the present invention provides an electromagnetic apparatus adapted for detecting and measuring conductive and/or magnetic bodies comprising means for transmitting in all directions at least two primary electromagnetic fields at different frequencies, and separate means for transmitting in all directions an additional reference electromagnetic field at another frequency. The present invention also provides means for receiving each of the transmitted fields including the responses due to the presence of various bodies in the earth, means for detecting the signals due to each of the received fields including said responses and means for separately comparing the detected signal at each of said primary frequencies with the detected signal at the reference frequency for detecting and measuring the conductive bodies and/or magnetic bodies. The present invention further provides that said means for detecting the signals due to each of the received fields including said responses may comprise a first plurality of filter circuits each connected to the means for receiving each of the transmitted fields including said responses and each tuned to a separate one of said frequencies, a modulator circuit connected to the output of each of said filter circuits, a detector circuit having its input connected to said modulator circuit and a second plurality of filter circuits including a first, a second and a third filter circuit each connected to the output of said detector circuit, said first and second filter circuits each being tuned to a separate one of said primary frequencies and said third filter circuit being tuned to said reference frequency. The present invention also provides that the means for separably comparing the detected signal at each of said primary frequencies with the detected signal at the reference frequency may include a first comparison circuit connected to the outputs of said first and said third filter circuits and a second comparison circuit connected to the outputs of said second and said third filter circuits.

Furthermore, the invention provides a method for detecting and measuring conductive bodies, and/or magnetic bodies comprising radiating in all directions at least two frequency-distinguished primary electromagnetic fields, radiating in all directions a reference electromagnetic field at a different frequency, moving the frequency-distinguished electromagnetic fields relative to an area to be investigated, detecting and separating the response to each of the electromagnetic fields, separately balancing the response due to each of said frequency-distinguished primary electromagnetic fields against the response due to the reference electromagnetic field to produce differential outputs and comparing the differential outputs for indicating and measuring the conductive bodies and magnetic bodies.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. An electromagnetic apparatus adapted for detecting the presence of conductive bodies and magnetic bodies and for determining the conductivity thereof comprising means for transmitting in all directions at least two electromagnetic fields having substantially the same orientation and differing substantially in frequency, means for transmitting in all directions an additional electromagnetic field having a substantially different orientation from said two fields and differing in frequency from said two fields for convenient separability therefrom, means for receiving each of the transmitted fields including the responses due to the presence of various bodies in the earth, means for detecting the signals due to each of the received fields including said responses and means for separately comparing the detected signal due to said additional field with the detected signal due to each of said two fields.

2. An electromagnetic apparatus in accordance with claim 1 wherein said transmitting means include a first and a second power source, a first and a second transmitting coil arranged in parallel planes and connected to said first and said second power sources, respectively, a third power source, and a third transmitting coil connected to said third power source and arranged in a plane substantially perpendicular to said parallel planes.

3. An electromagnetic apparatus in accordance with claim 2 wherein said means for receiving each of the transmitted fields includes a first and a second receiving coil tuned to the frequencies of said first and said second transmitting coils, respectively, said first and said second receiving coils being positioned in substantially coplanar relationship with said first and said second transmitting coils, respectively, and a third receiving coil tuned to the frequency of said third transmitting coil, said third transmitting and receiving coils being positioned in substantially coaxial relationship.

4. An electromagnetic apparatus in accordance with claim 1 wherein said means for detecting the signals due to each of the received fields including said responses comprise a plurality of filters each tuned to a separate one of said frequencies, said comparing means include a first and second comparing circuit connected to said filters, said first comparing circuit is connected to the filter which is tuned to the frequency of one of said two fields and is also connected to the filter which is tuned to the frequency of said additional field and wherein said second comparing circuit is connected to the filter which is tuned to the frequency of the other of said two fields and is also connected to the filter which is tuned to the frequency of said additional field.

5. An electromagnetic apparatus in accordance with claim 2 wherein said means for detecting the signals due to each of the received fields including said responses comprise a plurality of filters each tuned to a separate one of said frequencies, said comparing means include a first and second comparing circuit connected to said filters, said first comparing circuit is connected to the filter which is tuned to the frequency of one of said two fields and is also connected to the filter which is tuned to the frequency of said additional field and wherein said second comparing circuit is connected to the filter which is tuned to the frequency of the other of said two fields and is also connected to the filter which is tuned to the frequency of said additional field.

6. An electromagnetic apparatus in accordance with claim 3 wherein said means for detecting the signals due to each of the received fields including said responses comprise a plurality of filters each tuned to a separate one of said frequencies, said comparing means include a first and second comparing circuit connected to said filters, said first comparing circuit is connected to the filter which is tuned to the frequency of one of said two fields and is also connected to the filter which is tuned to the frequency of said additional field and wherein said second comparing circuit is connected to the filter which is tuned to the frequency of the other of said two fields and is also connected to the filter which is tuned to the frequency of said additional field.

7. An electromagnetic apparatus as defined in claim 1 wherein the means for transmitting said two electromagnetic fields comprises one transmitting coil radiating both of said two fields.

8. An electromagnetic apparatus as defined in claim 1 wherein the means for receiving said two electromagnetic fields comprises one receiving coil.

9. An electromagnetic apparatus as defined in claim 7 wherein the means for receiving said two electromagnetic fields comprises one receiving coil.

10. An airborne electromagnetic apparatus in accordance with claim 1 wherein said means for transmitting the electromagnetic fields are carried by an aircraft and the means for receiving each of the transmitted fields are in a bird towed by the aircraft by means of a tow cable, and wherein said means for detecting the signals due to each of the received fields including said responses comprise a first plurality of filter circuits each connected to the means for receiving each of the transmitted fields and each tuned to a separate one of said frequencies, a modulator circuit connected to the output of each of said filter circuits for impressing the filtered signals on an electrical carrier wave, said tow cable comprising a conductor means connected to said modulator circuit for transmitting the modulated carrier wave from the bird to the aircraft, a detector circuit in the aircraft for separating from the carrier wave the signals due to the electromagnetic fields including the responses due to the various bodies in the earth, a second plurality of filter circuits including a first, a second and a third filter circuit, each connected to the output of said detector circuit, said first and said second filter circuits each being tuned to a separate one of the frequencies of said two fields, said third filter circuit being tuned to the frequency of said additional field, and wherein said comparing means includes a first comparison circuit connected to the outputs of said first and said third filter circuits and a second comparison circuit connected to the outputs of said second and third filter circuits.

11. An airborne electromagnetic apparatus in accordance with claim 2 wherein said means for transmitting the electromagnetic fields are carried by an aircraft and the means for receiving each of the transmitted fields are in a bird towed by the aircraft by means of a tow cable, and wherein said means for detecting the signals due to each of the received fields including said responses comprise a first plurality of filter circuits each connected to the means for receiving each of the transmitted fields and each tuned to a separate one of said frequencies, a modulator circuit connected to the output of each of said filter circuits for impressing the filtered signals on an electrical carrier wave, said tow cable comprising a conductor means connected to said modulator circuit for transmitting the modulated carrier wave from the bird to the aircraft, a detector circuit in the aircraft for separating from the carrier wave the signals due to the electromagnetic fields including the responses due to the various bodies in the earth, a second plurality of filter circuits including a first, a second and a third filter circuit, each connected to the output of said detector circuit, said first and said second filter circuits each being tuned to a separate one of the frequencies of said two fields, said third filter circuit being tuned to the frequency of said additional field, and wherein said comparing means includes a first comparison circuit connected to the outputs of said first and said third filter circuits and a second comparison circuit connected to the outputs of said second and third filter circuits.

12. An airborne electromagnetic apparatus in accordance with claim 3 wherein said means for transmitting the electromagnetic fields are carried by an aircraft and the means for receiving each of the transmitted fields are in a bird towed by the aircraft by means of a tow cable, and wherein said means for detecting the signals due to each of the received fields including said responses comprise a first plurality of filter circuits each connected to the means for receiving each of the transmitted fields and each tuned to a separate one of said frequencies, a modulator circuit connected to the output of each of said filter circuits for impressing the filtered signals on an electrical carrier wave, said tow cable comprising a conductor means connected to said modulator circuit for transmitting the modulated carrier wave from the bird to the aircraft, a detector circuit in the aircraft for separating from the carrier wave the signals due to the electromagnetic fields including the responses due to the various bodies in the earth, a second plurality of filter circuits including a first, a second and a third filter circuit, each connected to the output of said detector circuit, said first and said second filter circuits each being tuned to a separate one of the frequencies of said two fields, said third filter circuit being tuned to the frequency of said additional field, and wherein said comparing means includes a first comparison circuit connected to the outputs of said first and said third filter circuits and a second comparison circuit connected to the outputs of said second and third filter circuits.

13. A method for detecting conductive bodies and magnetic bodies and for determining their conductivity comprising radiating in all directions at least two electromagnetic fields having substantially the same orientation but differing in frequency, radiating in all directions an additional electromagnetic field having a substantially different orientation from said two fields and differing in frequency from said two fields for convenient separability therefrom, moving the electromagnetic fields relative to an area to be investigated, detecting and separating the responses to each of the electromagnetic fields, separately balancing the response due to each of said two electromagnetic fields against the response due to said additional electromagnetic field to produce differential outputs, and comparing the differential outputs for indicating and measuring the conductive bodies and magnetic bodies.

14. A method as defined in claim 13 in which said additional field is orthogonal to said two fields.

15. A method as defined in claim 13 in which said two fields have similar field patterns.

16. A method for detecting and measuring mineral ore bodies in accordance with claim 13 wherein the frequency of one of said two electromagnetic fields is within the range of about 100 to 1000 cycles per second and the frequency of the other of said two electromagnetic fields is within the range of about 500 to 5000 cycles per second.

17. A method for detecting and measuring mineral ore bodies in accordance with claim 14 wherein the frequency of one of said two electromagnetic fields is within the range of about 100 to 1000 cycles per second and the frequency of the other of said two electromagnetic fields is within the range of about 500 to 5000 cycles per second.

18. A method for detecting and measuring mineral ore bodies in accordance with claim 15 wherein the frequency of one of said two electromagnetic fields is within the range of about 100 to 1000 cycles per second and the frequency of the other of said two electromagnetic fields is within the range of about 500 to 5000 cycles per second.

19. A method as defined in claim 13, comprising radiating said electromagnetic fields from an aircraft and receiving the responses to each of the electromagnetic fields in a bird trailed from the aircraft by a conductor, impressing the received signals on an electrical carrier wave, and transmitting the modulated electrical carrier wave along the conductor from the bird to the aircraft, and in which the detection and separation of the responses to each of the electromagnetic fields includes separating these responses from the electrical carrier wave.

20. A method as defined in claim 14, comprising radiating said electromagnetic fields from an aircraft and receiving the responses to each of the electromagnetic fields in a bird trailed from the aircraft by a conductor, impressing the received signals on an electrical carrier wave, and transmitting the modulated electrical carrier wave along the conductor from the bird to the aircraft, and in which the detection and separation of the responses to each of the electromagnetic fields includes separating these responses from the electrical carrier wave.

21. A method as defined in claim 15, comprising radiating said electromagnetic fields from an aircraft and receiving the responses to each of the electromagnetic fields in a bird trailed from the aircraft by a conductor, impressing the received signals on an electrical carrier wave, and transmitting the modulated electrical carrier wave along the conductor from the bird to the aircraft, and in which the detection and separation of the responses to each of the electromagnetic fields includes separating these responses from the electrical carrier wave.

22. A method for detecting conductive bodies and magnetic bodies and for determining the conductivity thereof, comprising creating in space at least two electromagnetic fields having substantially the same orientation and differing substantially in frequency, creating in space an additional electromagnetic field having a substantially different orientation from said two fields and differing in frequency from said two fields for convenient separability therefrom, moving the electromagnetic fields relative to an area to be investigated, detecting and separating the responses of each of the electromagnetic fields, and separately comparing the responses of each of said two fields with the response of the additional field.

23. A method for detecting conductive bodies and magnetic bodies and for determining the conductivity thereof, comprising subjecting a region which might contain such bodies to at least two electromagnetic fields having substantially the same orientation and differing substantially in frequency, subjecting said region to an additional electromagnetic field having a different orientation from said two fields and differing in frequency from said two fields for convenient separability therefrom, detecting the responses of each of the electromagnetic fields, and separately comparing the responses of each of the two fields with the response of the additional field.

24. A method for detecting conductive bodies and magnetic bodies and for determining the conductivity thereof, comprising creating in space a first electromagnetic field, creating in space at least a second electromagnetic field, said fields having substantially the same orientation but differing substantially in frequency whereby the relative effect of said bodies on said fields is conductivity-dependent, creating in space an additional electromagnetic field substantially less affected by said bodies than the aforementioned fields, detecting the responses of said fields, including the effects of said bodies, and separately and individually comparing the responses of each of said two fields with the response of said additional field.

25. The method of claim 24, further comprising producing a differential output from each of said comparisons, and concurrently recording said differential outputs whereby they may be readily compared.

References Cited in the file of this patent

UNITED STATES PATENTS

| | | |
|---|---|---|
| 2,573,137 | Greer | Oct. 30, 1951 |
| 2,623,924 | Cartier | Dec. 30, 1952 |
| 2,642,477 | Puranen | June 16, 1953 |
| 2,903,642 | Seigel | Sept. 8, 1959 |

UNITED STATES PATENT OFFICE
CERTIFICATION OF CORRECTION

Patent No. 2,955,250                          October 4, 1960

John La Motte Shaw et al.

It is hereby certified that error appears in the above numbered patent requiring correction and that the said Letters Patent should read as corrected below.

Column 1, line 70, strike out "good"; column 2, line 50, for "eelvational" read -- elevational --; column 5, line 50, for "aboslute" read -- absolute --; column 8, line 28, for "ad" read -- and --.

Signed and sealed this 20th day of June 1961.

(SEAL)
Attest:

ERNEST W. SWIDER                        DAVID L. LADD
Attesting Officer                        Commissioner of Patents